United States Patent
Vincent

(10) Patent No.: US 9,298,504 B1
(45) Date of Patent: Mar. 29, 2016

(54) SYSTEMS, DEVICES, AND TECHNIQUES FOR PREEMPTING AND REASSIGNING TASKS WITHIN A MULTIPROCESSOR SYSTEM

(75) Inventor: Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 225 days.

(21) Appl. No.: 13/493,681

(22) Filed: Jun. 11, 2012

(51) Int. Cl.
  *G06F 9/46* (2006.01)
  *G06F 9/48* (2006.01)
  *G06F 9/455* (2006.01)
  *G06F 9/50* (2006.01)

(52) U.S. Cl.
  CPC .......... *G06F 9/4881* (2013.01); *G06F 9/45533* (2013.01); *G06F 9/4843* (2013.01); *G06F 9/5077* (2013.01)

(58) Field of Classification Search
  CPC . G06F 9/45533; G06F 9/5077; G06F 9/4881; G06F 9/4843
  See application file for complete search history.

(56) References Cited

U.S. PATENT DOCUMENTS

| | | | | |
|---|---|---|---|---|
| 4,914,570 A | * | 4/1990 | Peacock | 718/106 |
| 5,247,675 A | * | 9/1993 | Farrell et al. | 718/103 |
| 5,418,913 A | * | 5/1995 | Fujimoto | 709/213 |
| 6,421,702 B1 | * | 7/2002 | Gulick | 718/102 |
| 6,430,593 B1 | * | 8/2002 | Lindsley | 718/103 |
| 6,675,191 B1 | * | 1/2004 | Ito | 718/102 |
| 7,302,684 B2 | * | 11/2007 | Hsieh | 718/102 |
| 7,493,436 B2 | * | 2/2009 | Blackmore et al. | 710/260 |
| 7,669,081 B2 | * | 2/2010 | Lett et al. | 714/20 |
| 7,996,593 B2 | * | 8/2011 | Blackmore et al. | 710/260 |
| 8,166,483 B2 | * | 4/2012 | Chrabieh | 718/103 |
| 8,381,210 B2 | * | 2/2013 | Wang et al. | 718/1 |
| 8,539,498 B2 | * | 9/2013 | Bohra et al. | 718/104 |
| 9,058,183 B2 | | 6/2015 | Woller et al. | |
| 2008/0104296 A1 | * | 5/2008 | Blackmore et al. | 710/267 |
| 2011/0161955 A1 | * | 6/2011 | Woller et al. | 718/1 |
| 2011/0225583 A1 | * | 9/2011 | Suh et al. | 718/1 |

OTHER PUBLICATIONS

Walker et al. "Interrupt Processing in Concurrent Processors", 1995 IEEE, 11 pages.*
Gountanis et al. "A Method of Processor Selection for Interrupt Handling in a Multiprocessor System", 1966 IEEE, pp. 1812-1819.*

* cited by examiner

*Primary Examiner* — Van Nguyen
(74) *Attorney, Agent, or Firm* — Lee & Hayes, PLLC

(57) ABSTRACT

In a system having multiple processors, idle processors are wakened in anticipation of tasks that may be subsequently queued. When interrupting a first processor to execute a particular task, a scheduler may also send interrupts to idle or otherwise available processors, instructing the idle processors to begin monitoring task queues and to find and execute compatible tasks that may be subsequently queued.

36 Claims, 5 Drawing Sheets

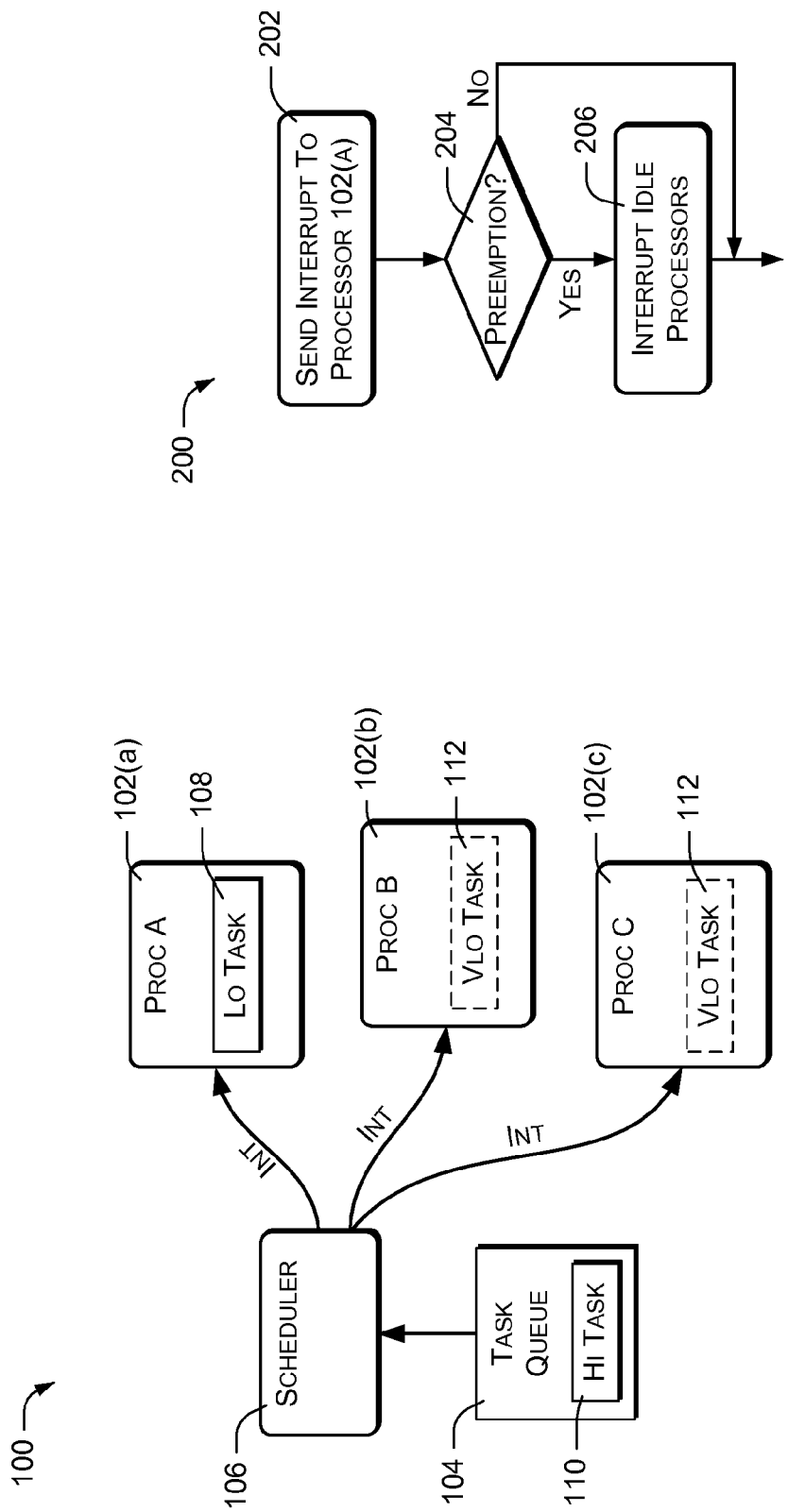

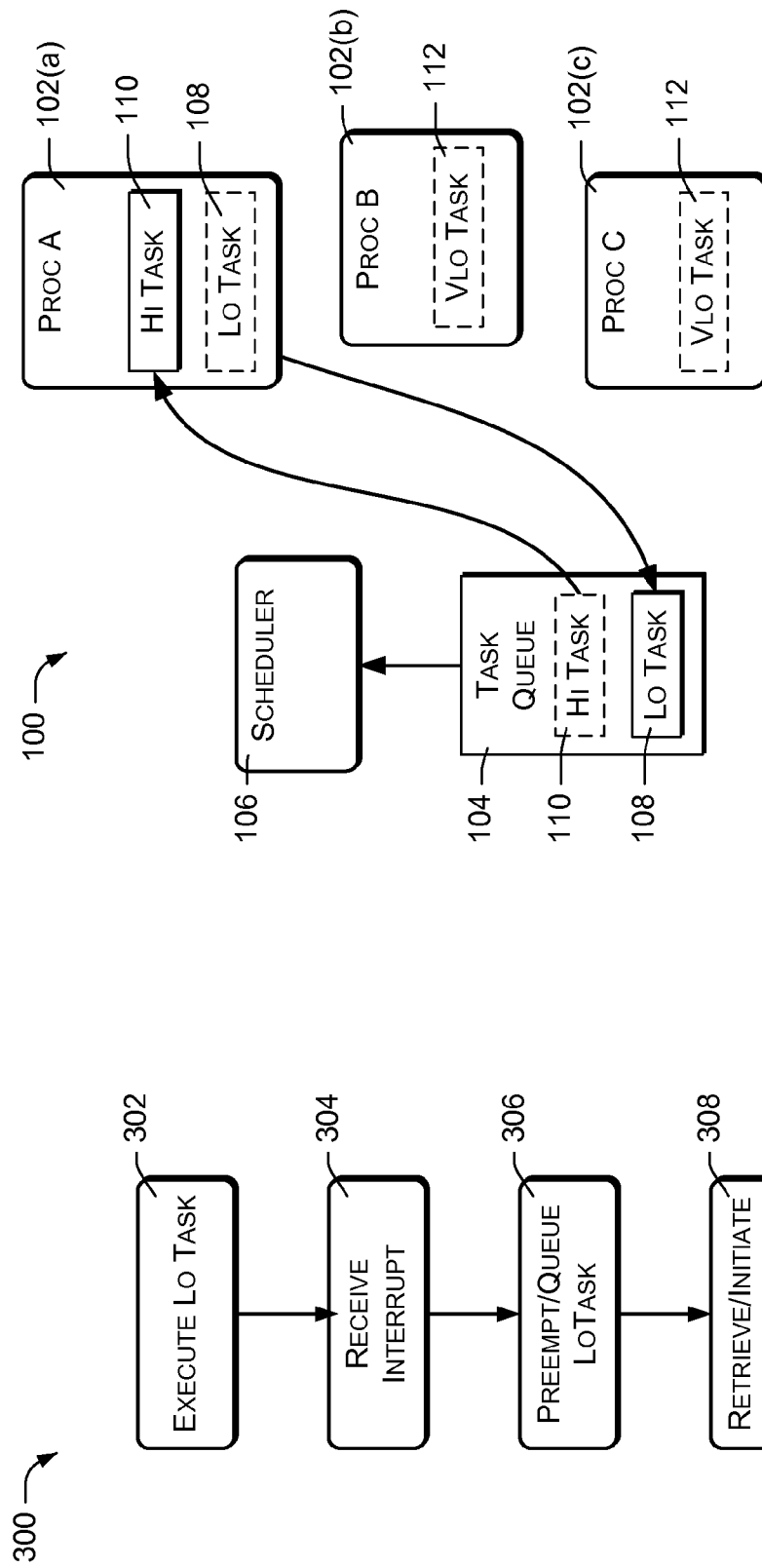

SYSTEMS, DEVICES, AND TECHNIQUES FOR PREEMPTING AND REASSIGNING TASKS WITHIN A MULTIPROCESSOR SYSTEM

BACKGROUND

Many microprocessors and other computing devices have multiple processors or cores, and are thus able to perform multiple concurrent tasks. Although different systems have different architectures, tasks are typically queued with different priorities or resource requirements, and scheduling algorithms are used to dynamically assign individual tasks to individual processors based on the priorities or required resources of the tasks.

Because tasks have different priorities and processor affinities, it is common for a processor to be interrupted as it is performing a particular task, and instructed to perform a task having a higher priority with respect the processor. When this happens, the currently executing task is preempted and put back into a queue, where it can be picked up again later by another processor.

In some situations, processors may have different capabilities or responsibilities, and certain tasks, referred to herein as high priority tasks, may require execution by particular processors. Tasks that have been preempted by high priority tasks may be immediately resumed by other processors that are currently idle or that are running lower priority tasks.

In order to preempt an executing task in favor of a high priority task, a scheduling component may send what is known as an inter-processor interrupt or IPI to the processor upon which the high priority task is to execute. An IPI is a signaling mechanism implemented within a multiprocessor architecture that allows different processors to interrupt each other.

Upon receiving the IPI, the processor preempts and queues the current task so that other processors can be given the opportunity to resume the task. In addition, the interrupted processor sends additional IPIs to idle processors of the system. These additional IPIs cause the idle processors to wake up and examine relevant task queues for the availability of new tasks. As a result of these activities, the interrupted processor begins executing the high priority task, and one of the previously idle processors eventually begins executing the preempted task.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1 is a block diagram illustrating a multiprocessor system in which tasks may be executed by multiple processors, and illustrating actions that may be performed by a scheduler.

FIG. 2 is a flow diagram illustrating an example method performed by a scheduler to assign a priority task to a particular processor.

FIG. 3 is a flow diagram illustrating an example method performed by one of the processors of FIG. 1.

FIG. 4 is a block diagram illustrating the multiprocessor system of FIG. 1, and illustrating actions that may be performed by an interrupted processor.

DETAILED DESCRIPTION

Figure 6:
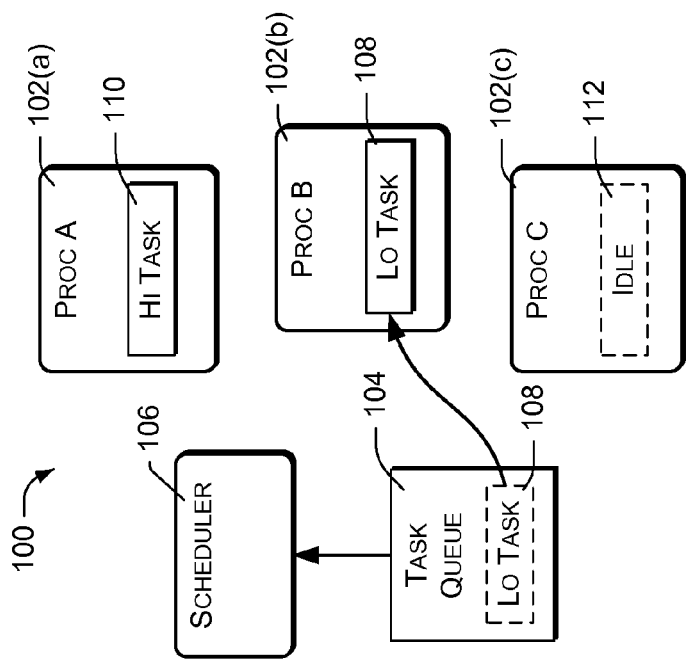
FIG. 6 is a block diagram illustrating the multiprocessor system of FIG. 1, and illustrating actions that may be performed by a previously idle processor.

This disclosure describes systems, devices, and techniques for preempting and reassigning tasks within a multiprocessor system. When a scheduling component interrupts a processor for execution of a priority task, the scheduling component also proactively wakes one or more other processors in anticipation of tasks that may be queued as a result of task preemption by the interrupted processor. Upon awakening, the other processors are configured to actively monitor task queues, without reentering their sleep or idle states, for some length of time in order to pick up any preempted task that is queued by the interrupted processor.

FIG. 1 shows an example of a multiprocessor system 100 having multiple processors 102, referred to individually as processors 102(a), 102(b), and 102(c), and alternatively referred to as CPUs. Although three processors are shown for purposes of discussion, the system 100 may include any number of processors, which may comprise virtual processors or physical processors.

The system 100 includes a task queue 104, into or upon which tasks may be placed for execution by one or more of the processors 102. Although the task queue 104 is illustrated as a single, discrete entity, it may be implemented in a distributed manner. For example, the task queue 104 may comprise multiple queues, associated with different processors and/or different types of tasks. The term "task queue" will be used in the following discussion to mean one or more task queues.

The system 100 also has a scheduler or scheduling component 106. The scheduler 106 may in practice be implemented by one or more of the processors 102. In some embodiments, the functions of the scheduler 106 may be performed in concert by a plurality of the processors 102. Thus, various of the processors 102 may be at least partially responsible for the scheduling functions that are described herein as being performed by the scheduler 106.

The system 100 is representative of various situations and architectures in which tasks may be assigned for execution or implementation by various types of resources. For example, the processors 102 may comprise physical processors of a server in a virtualization environment. In this type of environment, tasks may comprise virtual CPUs that are assigned to physical CPUs for implementation. The scheduler 106 in this environment may be part of a virtualization management system that manages multiple virtual CPUs for implementation by one or more physical CPUs.

As another example, the processors 102 may comprise physical or virtual processors of a physical or virtual machine. Tasks in such an environment may comprise threads that are assigned to virtual or physical CPUs for execution. The scheduler 106 in this type of environment may be part of an operating system that manages the threads of multiple processes.

Tasks in these environments may have processor affinities, meaning that they can be performed only by certain processors. In addition, tasks may have relative priorities amongst themselves. For purposes of this discussion, tasks will be referred to as "low-priority" (Lo) tasks and "high-priority" (Hi) tasks. The terms "low-priority" and "high-priority" indicate relative priorities rather than absolute priorities. Thus, although a given "high-priority" task may have priority over a given "low-priority" task, other tasks may have yet higher or lower priorities. In certain situations, a task may be referred to as a "very-low-priority" (VLo) task, indicating that it has a priority lower than a "low-priority" task. In some situations, a "very-low-priority" task may comprise an idle or null task, or a task with the lowest possible priority.

FIG. 1 shows a scenario in which the processor 102(a) is executing a low-priority task 108. A high-priority task 110 has been placed in the task queue 104. For purposes of discussion, it will be assumed that the high-priority task 110 is a task that is to be executed by a particular one of the processors, such as the processor 102(a). Furthermore, the high-priority task 110 is not compatible with being executed by any of other processors 102(b) and 102(c). The low-priority task 108, on the other hand, is compatible with being executed by any of the processors 102.

Prior to executing the high-priority task 110, the processor 102(a) will preempt the currently executing low-priority task 108 and place it in the task queue 104. In this example, it is assumed that the other processors—processors 102(b) and 102(c)—are executing very-low-priority tasks 112. In certain situations, the very-low-priority tasks 112 may represent idle processes. In other words, the processors 102(b) and 102(c) may comprise idle processors. In other situations, the very-low priority tasks 112 may comprise tasks having lower priorities than the low-priority task 108.

In order to execute the high-priority task 110 on the processor 102(a), the scheduler 106 sends an inter-processor interrupt (IPI) or other request to the processor 102(a), indicating that the processor 102(a) should interrupt its processing of the low-priority task 108 and inspect the task queue 104 for the presence of a high-priority task. Concurrently, the scheduler 106 proactively sends IPIs or other notifications to one or more of the idle processors, in this example processors 102(b) and 102(c). The IPIs to the idle processors 102(b) and 102(c) request those processors to wake up and begin monitoring the task queue 104 for tasks that may eventually be preempted and queued by the processor 102(a). Note that the IPIs to the idle processors are generated without waiting for the interrupted processor 102(a) to preempt or queue any tasks that the processor 102(a) may currently be executing.

In certain embodiments, IPIs may be generated, as illustrated, to all idle processors. In other embodiments, the scheduler 106 may determine which processors are available to execute the task that is being preempted by the processor 102(a), and may interrupt only those processors. More specifically, the scheduler 106 may account for affinities and priorities of any potentially preempted tasks when determining which of the remaining processors should receive IPIs. The scheduler 106 may also consider relative priorities of any processes currently being executed by the processors 102(b) and 102(c).

Furthermore, the scheduler 106 may account for multiple levels of preemption that may be triggered by execution of the high-priority task 110. For example, the low-priority task 108 that is preempted by the high-priority task 110 may itself cause preemption of a very-low-priority task 112. In a situation like this, the scheduler 106 may send interrupts to any processors 102 that will eventually receive new tasks as a result of the initial preemption. In other words, interrupts may be sent to a group of processors, including those processors that are predicted to execute preempted tasks in response to preempting the low-priority task 108.

FIG. 2 illustrates an example 200 of the process described above, which may be performed by the scheduler 106. In response to the presence in the task queue 104 of the high-priority task 110, the scheduler 106 performs an action 202 of requesting the processor 102(a) to execute the priority task 110. In practice, the action 202 may comprise interrupting the processor 102(a) by generating or sending an IPI to the processor 102(a).

At 204, the scheduler 106 also determines whether the processor 102(a) is executing another task that will be preempted, such as a low-priority task. If the result of this determination is positive, indicating that the interrupt of action 202 will result in preemption of a task, the scheduler 106 performs an additional action 206 of generating notifications or IPIs to one or more idle processors, such as processors 102(b) and 102(c). The notifications or IPIs wake the idle processors 102(b) and 102(c) and indicate to those processors that they should begin watching the task queue 104 for tasks that may eventually be preempted and queued in response to the action 202. Otherwise, if the interrupt request of action 202 will not result in task preemption by the processor 102(a), the action 206 may be skipped.

The interrupts of action 206 may be sent to all idle processors or to all processors that are currently executing tasks of lower priority than the low-priority task that has been preempted. In addition, the scheduler 106 may in some embodiments predict cascading results of preemption, and send interrupts to those processors that will eventually be expected to preempt their current tasks in response to the initial preemption performed by the processor 102(a).

In some embodiments, the action 206 may be performed unconditionally, in conjunction with the action 202. Furthermore, the IPIs of action 206 may be generated independently of any reaction or response by the processor 102(a) to the interrupt action 202. In other words, the scheduler 106 does not wait for a response from the processor 102(a) before performing the action 206 of waking the idle processors 102(b) and 102(c). More specifically, the action 206 is performed without waiting for the interrupted processor 102(a) to place a preempted task on the task queue 104.

FIG. 3 illustrates an example method 300 that may be performed by the processor 102(a) in conjunction with receiving the interrupt described above. An action 302 comprises executing a task such as a low-priority task. An action 304 comprises receiving an interrupt from the scheduler 106. An action 306, performed in response to receiving the interrupt, comprises preempting the currently executing low-priority task 108 and placing the low-priority task 108 in or onto the task queue 104. An action 308, again performed in response to receiving the interrupt, comprises retrieving the high-priority task 110 from the task queue 104 and initiating or executing the high-priority task 110.

In certain embodiments, the interrupted processor 102(a) may be configured such that it does not send interrupts or otherwise alert or wake the idle processors 102(b) and 102(c). This is because it may be assumed that the scheduler 106 has proactively or anticipatorily sent interrupts to the idle processors 102(b) and 102(c) for this purpose.

FIG. 4 illustrates the results of the example method 300. The high-priority task 110 moves from the task queue 104 to the processor 102(a), and the low-priority task 110 moves from the processor 102(a) to the task queue 104.

Figure 5:
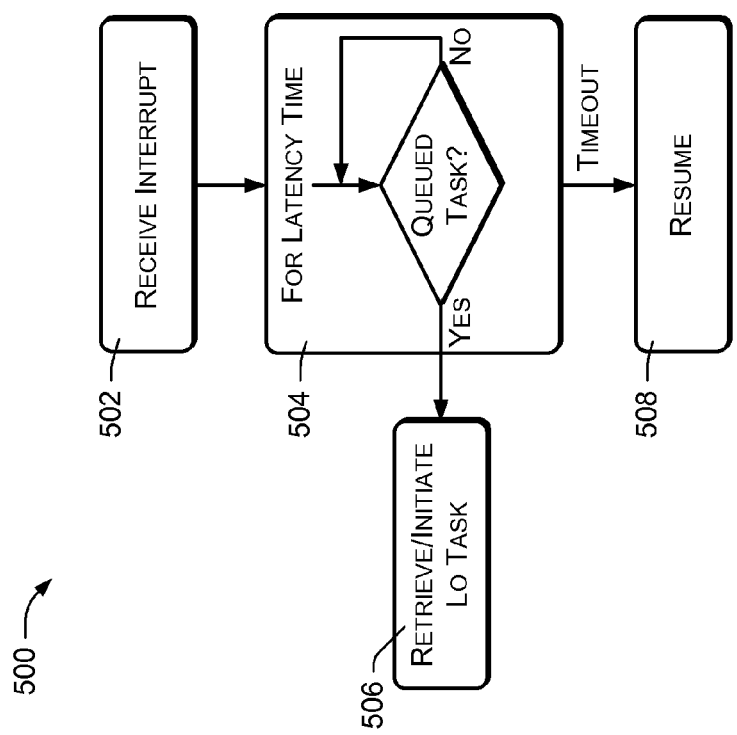
FIG. 5 is a flow diagram illustrating an example method performed by one of the processors of FIG. 1.

FIG. 5 illustrates an example method 500 that may be performed by each of the idle processors 102(b) and 102(c) upon receiving the interrupt of action 206 (FIG. 1). An action 502 comprises receiving the interrupt that was initiated or generated by the scheduler 106. An action 504 comprises inspecting, watching, or otherwise actively monitoring the task queue 104 for a determined time period, without reentering the processor idle state, to detect any queued tasks that are compatible with being executed by the processor 102(b) or 102(c). If a qualifying or compatible task is found in the task queue 104, an action 506 is performed, which comprises retrieving, initiating, and/or executing the task. Otherwise, if the determined time period expires without finding a task in the task queue 104, the processor may re-enter its idle state or resume its previous processing in a resume action 508.

The determined time period may be defined as a static constant, or may be a variable time period that is determined dynamically. The time period may relate to the expected IPI latency or the latency of any other interrupt mechanism used to alert or awaken the idle processors 102(b) and 102(c). For example, the time period may be set to be at least as long as the expected or historically observed time for the interrupted processor 102(a) to place the interrupted task in the task queue. In addition, or alternatively, the time period may relate to the priority of the task being interrupted relative to the priority of the task that has been queued for execution Generally, the time period is established as a time that is long enough to ensure that other processors such as processor 102(a) have had a chance to preempt and queue their interrupted tasks.

In some embodiments, actual latency may be measured during system operation, and the expected latency time may be specified in proportion to the measured latency. In some embodiments, the expected latency time may be specified dynamically in response to the relative priorities of tasks that are expected to be queued and/or the tasks that the interrupted processors were previously executing.

FIG. 6 illustrates the results of the example method 500, where the low-priority task 108 moves from the task queue 104 to the processor 102(b).

The described technique of anticipatorily awakening idle processors may increase the utilization of processors in certain embodiments. This is because an inter-processor interrupt consumes significant overhead, and can take an appreciable amount of time to be generated, received, and processed. Anticipatorily generating IPIs to idle processors at the same time as instructing a particular processor to preempt its currently executing task allows the idle processors to resume the preempted task much more quickly.

Note that the interrupts described above may be implemented in various ways, and that the nature of such interrupts may vary depending on circumstances. In certain situations, IPIs may be used as described above. In other situations, however, the scheduler 106 may be executing on the processor whose task is to be preempted. In this case, an interrupt may be generated by some means other than an inter-processor interrupt, such as by setting a flag or alert within the environment of the processor.

Figure 7:
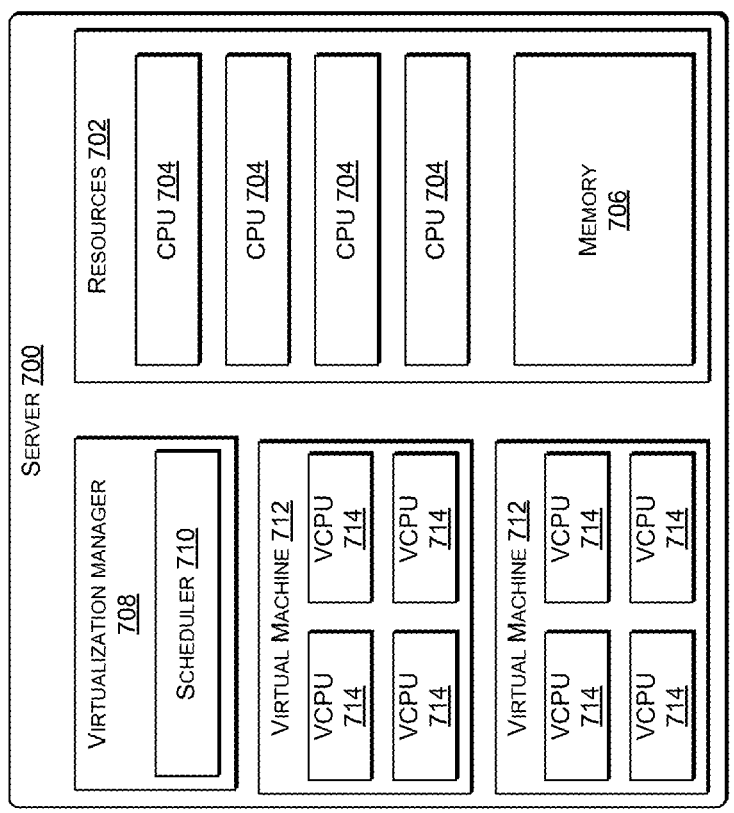
FIG. 7 is a block diagram showing high-level components of an example server that may be configured and programmed to implement portions of the functionality described herein.

FIG. 7 illustrates relevant components of an example computer or server configuration that may be used to implement aspects of the functionality described above. In a very basic configuration, an example computer server 700 might comprise a plurality of physical resources 702, which may include multiple physical CPUs 704 and memory 706.

The memory 706 may comprise computer readable storage media and may include volatile and nonvolatile memory. Thus, the memory 706 may include, but is not limited to, RAM, ROM, EEPROM, flash memory, or other memory technology, or any other medium which can be used to store media items or applications and data which can be accessed by the CPUs 704. The memory 706 may also include removable memory such as DVDs, CD-ROMs, flash memory, portable memory devices, and so forth.

The server 700 may also include a virtual machine or virtualization manager 708, which may be implemented as a process that is executed from the memory 706 by one or more of the CPUs 704. The virtualization manager 708 may implement a scheduler 710, and may manage multiple virtual machines or virtual machine instances 712, each of which may comprise one or more virtual CPUs (VCPUs) 714. The scheduler may be responsible for, among other things, assigning the virtual CPUs 714 for execution on particular CPUs 704, as describe above with reference to the scheduler 106.

The server 700 may include many logical, programmatic, and physical components, of which those shown in FIG. 7 are merely examples that are related to the discussion herein.

Figure 8:
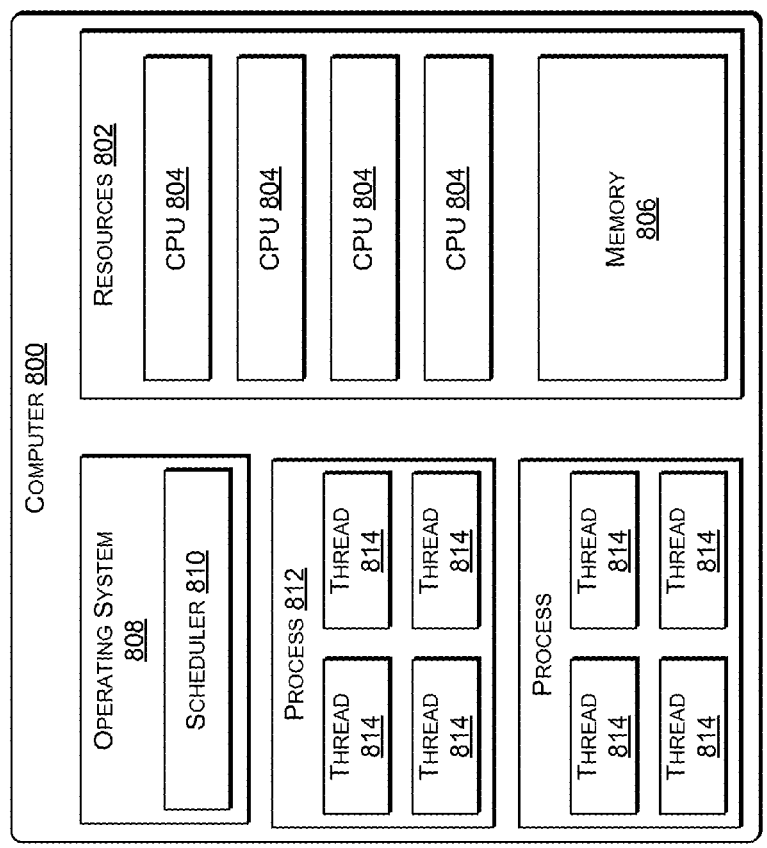
FIG. 8 is a block diagram showing high-level components of an example computer that may be configured and programmed to implement portions of the functionality described herein.

FIG. 8 illustrates relevant components of an example computer configuration that may be used to implement aspects of the functionality described above. An example computer 800 may comprise a plurality of resources 802, which may include physical resources and/or virtual resources. The resources 802 may include multiple CPUs 804, which may comprise virtual and/or physical CPUs.

The resources 802 may also include memory 806 may comprise computer readable storage media and may include volatile and nonvolatile memory. The memory 806 may include, but is not limited to, RAM, ROM, EEPROM, flash memory, or other memory technology, or any other medium which can be used to store media items or applications and data which can be accessed by the CPUs 804. The memory 806 may also include removable memory such as DVDs, CD-ROMs, flash memory, portable memory devices, and so forth.

The computer 800 may also include an operating system 808, which may be implanted as a process that is executed from the memory 806 by one or more of the CPUs 804. The operating system 808 may implement a process scheduler 810, and may manage multiple processes 812, each of which may comprise one or more execution threads 814. The scheduler 810 may be responsible for, among other things, assigning the threads 814 for execution on particular CPUs 804, as describe above with reference to the scheduler 106.

The computer 800 may include many logical, programmatic, and physical components, of which those shown in FIG. 8 are merely examples that are related to the discussion herein.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types. Software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a plurality of physical processors;
one or more task queues;
a virtual machine manager configured to (a) request a first of the physical processors to execute a high priority virtual processor and to (b) wake at least a second of the physical processors to watch the one or more task queues for virtual processors that are preempted and queued in response to interrupting the first of the physical processors based at least on the request;
the first of the physical processors being configured to preempt a previously executing virtual processor in response to the request and to place the preempted virtual processor in the one or more task queues;
the second of the physical processors being configured upon being awakened to actively monitor the one or more task queues and to execute the preempted virtual processor; and
wherein the virtual machine manager is configured to wake the second processor without waiting for the first processor to place the preempted virtual processor in the one or more queues.

2. The system of claim 1, wherein the virtual machine manager requests the first of the physical processors to execute the high priority virtual processor by generating an inter-processor interrupt for interrupting the first of the physical processors.

3. The system of claim 1, wherein the virtual machine manager wakes the second of the physical processors by generating an inter-processor interrupt.

4. The system of claim 1, wherein the second of the physical processors is configured to actively monitor the one or more task queues for a predetermined time.

5. The system of claim 1, wherein the second of the physical processors is configured to watch the one or more task queues for a time that is based at least in part on the priority of the preempted virtual processor.

6. The system of claim 1, wherein the second of the physical processors is configured to watch the one or more task queues for a time that is based at least in part on an expected time for the first of the physical processors to place the preempted virtual processor in the one or more task queues.

7. The system of claim 1, wherein the second of the physical processors is configured to watch the one or more task queues for a time that is based at least in part on an observed time for the first of the physical processors to place the preempted virtual processor in the one or more task queues.

8. The system of claim 1, wherein the high priority virtual processor is not compatible with being executed by the second of the physical processors.

9. The system of claim 1, wherein the preempted virtual processor is compatible with being executed by at least one of the plurality of physical processors.

10. The system of claim 1, wherein the first of the physical processors is configured to (a) preempt a low-priority virtual processor in response to the request; (b) place the preempted low-priority virtual processor in the one or more task queues, and (c) not wake the second of the physical processors upon placing the preempted low-priority virtual processor in the one or more task queues.

11. The system of claim 1, wherein the virtual machine concurrently wakes multiple physical processors that are predicted to execute preempted tasks in response to preempting the previously executing virtual processor.

12. A computer-implemented method, comprising:
under control of one or more processors configured with executable instructions,
executing a first task on a first processor;
interrupting the first processor to execute a second task on the first processor;
interrupting a second processor to monitor tasks in a task queue in response to the interrupting of the first processor, wherein interrupting the second processor comprises waking the second processor without waiting for the first task to be placed in the task queue;
preempting the first task and placing the first task in the task queue in response to interrupting the first processor; and
resuming the first task on the second processor after the first task is placed in the task queue.

13. The method of claim 12, wherein the interrupting is performed by an operating system scheduler.

14. The method of claim 12, wherein the interrupting is performed by a virtual machine scheduler.

15. The method of claim 12, further comprising interrupting a plurality of processors to monitor tasks in the task queue concurrently with interrupting the first processor to execute the second task, wherein the plurality of processors comprise processors that are predicted to execute preempted tasks in response to interrupting the first processor.

16. The method of claim 12, wherein the first and second processors comprise virtual processors.

17. The method of claim 12, wherein the first and second tasks comprise virtual processors.

18. The method of claim 12, wherein the first and second processors comprise physical processors.

19. The method of claim 12, wherein the first and second tasks comprise execution threads.

20. The method of claim 12, wherein interrupting the first processor comprises generating an inter-processor interrupt to the first processor.

21. The method of claim 12, wherein waking the second processor comprises generating an inter-processor interrupt to the second processor.

22. The method of claim 12, wherein the second processor is configured to actively monitor the task queue for a predetermined time in response to waking the second processor.

23. The method of claim 12, wherein the second processor is configured to actively monitor the task queue for a time that is based at least in part on the priority of the first task.

24. The method of claim 12, wherein the second processor is configured to actively monitor the task queue for a time that is based at least in part on an expected time for the first processor to place the first task in the task queue.

25. The method of claim 12, wherein the second processor is configured to actively monitor the task queue for a time that is based at least in part on an observed time for the first processor to place the first task in the task queue.

26. The method of claim 12, wherein the first processor is configured to not wake the second processor when placing the first task in the task queue.

27. The method of claim 12, further comprising interrupting a plurality of processors to watch for tasks in the task queue concurrently with interrupting the first processor to execute the second task, wherein the plurality of processors comprise processors that are predicted to execute preempted tasks in response to interrupting the first processor.

28. One or more non-transitory computer-readable media containing instructions that are executable by one or more processors to perform actions comprising:
   executing a first task on a first processor;
   interrupting the first processor to execute a second task;
   interrupting a second processor to watch for tasks in a task queue in response to the interrupting of the first processor, wherein interrupting the second processor is performed without waiting for the first processor to respond to interrupting the first processor and without waiting for the first task to be placed in the task queue;
   in response to interrupting the first processor, preempting the first task on the first processor and placing the first task in the task queue; and
   resuming the first task on the second processor after the first task is placed in the task queue.

29. The one or more non-transitory computer-readable media of claim 28, the acts further comprising interrupting a plurality of processors to watch for tasks in the task queue, without waiting for the first processor to respond to interrupting the first processor, wherein the plurality of processors comprise processors that are predicted to execute preempted tasks in response to interrupting the first processor.

30. The one or more non-transitory computer-readable media of claim 28, wherein interrupting the first processor comprises generating an inter-processor interrupt to the first processor.

31. The one or more non-transitory computer-readable media of claim 28, wherein interrupting the second processor comprises generating an inter-processor interrupt to the second processor.

32. The one or more non-transitory computer-readable media of claim 28, wherein the second processor is configured to actively monitor the task queue for a predetermined time in response to interrupting the second processor.

33. The one or more non-transitory computer-readable media of claim 28, wherein the second processor is configured to actively monitor the task queue for a time that is based at least in part on the priority of the first task.

34. The one or more non-transitory computer-readable media of claim 28, wherein the second processor is configured to actively monitor the task queue for a time that is based at least in part on an expected time for the first processor to place the first task in the task queue.

35. The one or more non-transitory computer-readable media of claim 28, wherein the second processor is configured to actively monitor the task queue for a time that is based at least in part on an observed time for the first processor to place the first task in the task queue.

36. The one or more non-transitory computer-readable media of claim 28, wherein the first processor is configured to not interrupt the second processor when placing the first task in the task queue.

* * * * *